United States Patent [19]

Guillou

[11] Patent Number: 5,431,839
[45] Date of Patent: Jul. 11, 1995

[54] SULFAMIC ACID CLEANING/STRIPPING COMPOSITIONS COMPRISING HETEROPOLYSACCHARIDE THICKENING AGENTS

[75] Inventor: Veronique Guillou, Suresnes, France

[73] Assignee: Rhone-Poulenc Chimie, Courbevoie, France

[21] Appl. No.: 272,836

[22] Filed: Jul. 11, 1994

[30] Foreign Application Priority Data

Jul. 9, 1993 [FR] France ............... 93 08503

[51] Int. Cl.$^6$ ............ C02F 5/08; C23F 11/00; C11D 7/08; C23G 1/06
[52] U.S. Cl. .............. 252/174.17; 252/80; 252/82; 252/145; 252/151
[58] Field of Search .............. 252/174.17, 80, 82, 252/145, 151

[56] References Cited

U.S. PATENT DOCUMENTS

| | | | |
|---|---|---|---|
| 2,225,294 | 12/1940 | Bolten et al. | 252/142 |
| 4,554,049 | 11/1985 | Bastenbeck | 156/656 |
| 4,855,069 | 8/1989 | Schuppiser et al. | 252/142 |
| 4,900,457 | 2/1990 | Clarke-Sturman et al. | 252/8.514 |
| 4,960,534 | 10/1990 | Smith et al. | 252/142 |
| 5,348,675 | 9/1994 | Ullmann et al. | 252/82 |

FOREIGN PATENT DOCUMENTS

| | | | |
|---|---|---|---|
| 0241779 | 1/1990 | European Pat. Off. | C11D 7/08 |
| 0351303 | 1/1990 | European Pat. Off. | C12P 19/04 |

OTHER PUBLICATIONS

Patent Abstracts of Japan, vol. 004, No. 140 (C-026), Oct. 3, 1980 & JP-A-55 089 497 (Hitachi Ltd.) Jul. 7, 1980.

Primary Examiner—Paul Lieberman
Assistant Examiner—Patricia L. Hailey
Attorney, Agent, or Firm—Burns, Doane, Swecker & Mathis

[57] ABSTRACT

Rheologically stable sulfamic acid cleaning/stripping compositions, well suited for removing a wide variety of organic and inorganic contaminating deposits from diverse surfaces and substrates, contain a succinoglycan heteropolysaccharide thickening agent and a stabilizing amount of potassium sulfamate.

14 Claims, No Drawings

SULFAMIC ACID CLEANING/STRIPPING COMPOSITIONS COMPRISING HETEROPOLYSACCHARIDE THICKENING AGENTS

BACKGROUND OF THE INVENTION

1. Field of the Invention

The present invention relates to novel cleaning/stripping compositions based on sulfamic acid and incorporating a heteropolysaccharide of succinoglycan type as a thickening agent therefor.

2. Description of the Prior Art

It is conventional in this art to employ compositions for treating surfaces which are covered or coated with inorganic and/or organic contaminating deposits. These inorganic deposits generally are compounds such as carbonates, sulfates and oxides of metals, for example of calcium, magnesium, potassium and iron. The acid included in these compositions is generally selected on the basis of the chemical nature of the deposit to be removed. Among the most frequently used such acids, particularly exemplary thereof are phosphoric acid, which is more specific for stripping rust, hydrochloric and formic acids, which are appropriate for descaling porcelain surfaces, and sulfamic acid. Among the aforesaid acids, sulfamic acid proves to be very effective. However, its strong acidity, which is an advantage in terms of efficacy, presents a serious problem in respect of the preparation of corresponding formulations therefrom.

Indeed, the known stripping compositions typically incorporate a viscosity modifying agent which is intended to render them less fluid. There then follows a prolonged period of time of contact between the acid and the surface to be cleaned, which is thus beneficial to the activity of the acid with respect to the substrate or surface to which it is applied. Xanthan gum proves to be one of the most typically employed viscosity modifying agents and numerous cleaning compositions comprised thereof are known to this art, for example those described in EP-233,110.

Nonetheless, in contradistinction to the other acids indicated above, sulfamic acid is incompatible with xanthan gum taking account of its low pK, on the order of 1. Thus, the xanthan gum is degraded rapidly when contacted with sulfamic acid. Hence, thickened formulations based on sulfamic acid and having viscosities which are stable over time are not currently available.

SUMMARY OF THE INVENTION

Accordingly, a major object of the present invention is the provision of improved sulfamic acid cleaning/stripping compositions comprising a thickening agent that are stable over time and otherwise avoid or conspicuously ameliorate the above disadvantages and drawbacks to date characterizing the state of this art.

Briefly, the present invention features aqueous compositions based on sulfamic acid, comprising a heteropolysaccharide of succinoglycan type as a thickening agent therefor, said thickening agent being stabilized therein by an effective amount of potassium sulfamate.

DETAILED DESCRIPTION OF BEST MODE AND PREFERRED EMBODIMENTS OF THE INVENTION

More particularly according to the present invention, it has now unexpectedly been found that incorporating a succinoglycan heteropolysaccharide thickening agent and an effective amount of potassium sulfamate into aqueous sulfamic acid solutions provides compositions that maintain their thickened consistency over prolonged periods of time.

By "heteropolysaccharide of succinoglycan type" is intended a heteropolysaccharide or hydrocolloid containing moieties deriving from glucose, from galactose and from pyruvic, succinic and acetic acid salts.

Such succinoglycan heteropolysaccharides according to the invention are preferably obtained by fermenting a carbohydrate by means of a suitable microorganism. Exemplary microorganisms include, in particular, bacteria belonging to the genus Agrobacterium and more especially the species *Agrobacterium radiobacter*, *Agrobacterium rhizogenes* and *Agrobacterium tumefaciens*.

The heteropolysaccharide is more preferably the succinoglycan obtained by fermenting a carbohydrate using an *Agrobacterium tumefaciens* I 736 culture, or one of the mutants or recombinants thereof.

This heteropolysaccharide is described in EP-351,303.

The potassium sulfamate may be introduced as is into the thickened aqueous acid composition, or may, alternatively, be generated in situ. This second option assumes that the amount of starting sulfamic acid has been increased in this regard. The potassium sulfamate is generated in situ simply by adding a sufficient amount of potassium hydroxide to the composition.

The relative proportions of sulfamic acid, the heteropolysaccharide of succinoglycan type and the potassium sulfamate in the compositions according to the invention may vary over wide limits, depending on the desired viscosity and the specific application intended.

Their pH generally ranges from 0.5 to 1.5. As regards the amount of heteropolysaccharide of succinoglycan type, it advantageously ranges from 0.01% to 0.8% by weight relative to the total weight of the composition.

For example, an aqueous composition of pH of from 0.5 to 1.5 and having a viscosity on the order of 200 to 6,000 mPa.s comprises, by weight, approximately 5% to 10% of sulfamic acid, 0.1% to 0.6% by weight of heteropolysaccharide of succinoglycan type and from 0.1% to 6% by weight of potassium sulfamate.

In cleaning compositions, the acid is generally included in an amount ranging from 0.5 mol to 10 mol per liter of composition, such as to provide an effective cleaning action. The amount of salt depends on the value of the pK and on the amount of free acid present in the composition. The amount necessary will be determined such as to maintain the pH of the solution at a value approximately ranging from 0.5 to 1.5. The optimum pH will depend upon the nature of the deposit to be removed and on the nature of the surface to be cleaned.

The amount of polysaccharide incorporated into the composition may also vary widely depending on the desired consistency of the composition, which may range from a liquid to a gel. It is important for cleaning surfaces for the viscosity and/or the yield point to be such that the composition can be applied at the desired thickness and maintained on inclined surfaces without the composition running. Useful compositions for descaling sanitary articles are generally packaged in a "spray" bottle. In this type of packaging, the amounts of heteropolysaccharide will be lower and adjusted in order to allow an easy flow from the nozzle, while having a sufficient viscosity to remain in contact with the surface to be cleaned. On the other hand, compositions in the form of a thick or pasty gel, more especially adapted for stripping by spreading using a knife, a fine or coarse brush, or in the form of a solid gel which may be diluted with water, may contain a larger proportion of the heteropolysaccharide. In all instances, the amounts of potassium sulfamate will be adjusted to provide a thickened formulation which is stable over time. One skilled in this art can easily make these adjustments.

The compositions of the invention may be formulated in any manner desired, by mixing the additives in water. It is preferable to initially disperse and dissolve the polysaccharide in water and then to add the acid and, finally, the salt.

The addition of potassium sulfamate or formation thereof in situ presents the advantage of increasing the yield point for the composition. In addition, it permits the hydrolysis of the polysaccharide to be minimized, which is reflected in a decrease in the viscosity and in the yield point. The compositions may thus be stored while conserving satisfactory long-term rheological properties. The subject compositions are particularly useful for cleaning surfaces coated with organic and/or inorganic deposits.

The subject compositions may optionally contain various other ingredients, additives and adjuvants which are conventionally employed in acidic formulations, such as surface-active agents, colorants, detergents, perfumes, bactericides, abrasive agents, etc.

In order to further illustrate the present invention and the advantages thereof, the following specific examples are given, it being understood that same are intended only as illustrative and in nowise limitative.

The succinoglycan employed in said examples to follow was obtained via the fermentation of a hydrocarbon substrate by the strain *Agrobacterium tumefaciens* I 736 which is described in EP-351,303.

With respect to the experimental procedure employed for the preparation of this succinoglycan, this too is described in said EP-351,303.

EXAMPLES

Aqueous compositions based on 8% by weight of sulfamic acid were thickened using 0.3% by weight of the succinoglycan identified above.

In the case of the formulation according to the invention, the sulfamic acid potassium salt was generated in situ by incorporating potassium hydroxide. To accomplish this, the potassium hydroxide was introduced in a sufficient amount to neutralize 1.3% of the sulfamic acid initially present, which effectively connotes generating 13.4 mmol of potassium sulfamate per 100 g of aqueous formulation.

As regards the control formulations, namely, those not containing potassium sulfamate, one of which had no salt incorporated and the three others contained an inorganic salt selected from among KCl, $Na_2SO_4$ and $K_2SO_4$. In the same manner, each of these salts was introduced at a concentration of 13.4 mmol per 100 g of formulation. This effectively represents adding to each of the corresponding formulations 1% by weight of KCl, 1.9% by weight of $Na_2SO_4$ and 2.3% of $K_2SO_4$.

In all instances, the formulations were adjusted to 100 g with water. Their pH was on the order of 0.7.

The stability over time and with temperature of each of these formulations was evaluated by determining their respective viscosities at ambient temperature, 25° C., and 45° C., for 5 months.

The viscosity measurements were carried out using a Brookfield viscometer with a No. 2 needle and a rate of rotation of 10 rpm.

The Table presented below indicates the results obtained.

It will be appreciated that the control No. 1, i.e., without addition of salt, lost almost half of its viscosity after three months at room temperature and lost all of its viscosity at 45° C.

The addition of potassium sulfate or of sodium sulfate in no way improved the stability of the system.

The addition of potassium chloride provided some improvement, but its corresponding formulations present the disadvantage of initiating serious corrosion problems.

It is clearly apparent that potassium sulfamate provided the best results. Its presence provided a formulation which was perfectly stable for at least three months at room temperature and doubled the life of the formula at 45° C.

TABLE

| FORMULATION TESTED | pH | STORAGE PERIOD (in days) | STORAGE AT 25° C. VISCOSITY (mPa·s) | STORAGE AT 45° C. VISCOSITY (mPa·s) |
|---|---|---|---|---|
| Control without salt | 0.66 | 0 | 1800 | 1800 |
| | | 30 | 1520 | 0 |
| | | 60 | 1200 | |
| | | 140 | 280 | |
| With potassium sulfamate | 0.70 | 0 | 1800 | 1800 |
| | | 30 | 1520 | 840 |
| | | 60 | 1560 | 480 |
| | | 140 | 1240 | |
| With sodium sulfate | 0.73 | 0 | 1800 | 1800 |
| | | 30 | 1580 | 120 |
| | | 60 | 1400 | 0 |
| | | 140 | 440 | |
| with potassium sulfate | 0.75 | 0 | 1800 | 1800 |
| | | 30 | 1500 | 120 |
| | | 60 | 1360 | 0 |
| | | 140 | 440 | |
| with potassium chloride | 0.65 | 0 | 1800 | 1800 |
| | | 30 | 1560 | 440 |
| | | 60 | 1440 | 0 |
| | | 140 | 960 | |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A cleaning/stripping composition comprising an effective contaminant-removing amount of sulfamic acid, a thickening amount of a succinoglycan heteropolysaccharide and an effective stabilizing amount of potassium sulfamate.

2. The cleaning/stripping composition as defined by claim 1, comprising a thickened aqueous formulation.

3. The cleaning/stripping composition as defined by claim 2, said succinoglycan heteropolysaccharide being obtained via microbial fermentation of a carbohydrate using a strain of microorganism of the genus Agrobacterium.

4. The cleaning/stripping composition as defined by claim 3, said microorganism being the species *Agrobacterium radiobacter*, *Agrobacterium rhizogenes* or *Agrobacterium tumefaciens*.

5. The cleaning/stripping composition as defined by claim 4, said microorganism being the species *Agrobacterium tumefaciens* I 736, or mutant or recombinant thereof.

6. The cleaning/stripping composition as defined by claim 2, having a pH ranging from 0.5 to 1.5.

7. The cleaning/stripping composition as defined by claim 6, having a viscosity ranging from 200 to 6,000 mPa.s.

8. The cleaning/stripping composition as defined by claim 2, comprising from 0.01% to 0.8% by weight of said succinoglycan heteropolysaccharide.

9. The cleaning/stripping composition as defined by claim 8, comprising from 0.5 mol to 10 mol of sulfamic acid per liter thereof.

10. The cleaning/stripping composition as defined by claim 7, comprising from 5% to 10% by weight of sulfamic acid, from 0.1% to 0.6% by weight of said succinoglycan heteropolysaccharide and from 0.1% to 6% by weight of potassium sulfamate.

11. The cleaning/stripping composition as defined by claim 2, comprising a gel.

12. The cleaning/stripping composition as defined by claim 2, comprising a sprayable liquid.

13. The cleaning/stripping composition as defined by claim 2, further comprising a surfactant, colorant, detergent, perfume, bactericide, abrasive, or combination thereof.

14. In a method for the cleaning of a deposit-contaminated surface via treatment with a cleaning/stripping composition, the improvement which comprises, as said cleaning/stripping composition therefor, the cleaning/stripping composition as defined by claim 1.

* * * * *